United States Patent Office 2,904,559
Patented Sept. 15, 1959

2,904,559

STABILIZATION OF TETRAHYDROFURFURYL ALCOHOL

Leon A. Grosmaire, Memphis, Tenn., assignor to The Quaker Oats Company, Chicago, Ill., a corporation of New Jersey No Drawing. Application August 18, 1958
Serial No. 755,367

6 Claims. (Cl. 260—347.8)

This invention relates to the stabilization of tetrahydrofurfuryl alcohol and in particular to its color stabilization.

Tetrahydrofurfuryl alcohol is useful in synthetic organic chemistry and in special cases as a solvent. The freshly distilled product is a colorless liquid which acquires an undesirable dark yellow color on standing for a relatively short period of time in contact with metals and air. For most uses the alcohol must be colorless or nearly so. Accordingly after the usual shipment and storage in metal containers it is necessary to redistill the alcohol and then use it immediately. Thus, when tetrahydrofurfuryl alcohol is to be used at a distance from the point of production, time and labor are required for the additional distillation and also economic losses are incurred since part of the product is always lost during the handling and distillation.

It is one of the objects of this invention to provide a novel method for the color stabilization of tetrahydrofurfuryl alcohol.

Another object of the invention is to prevent undesirable discoloration of tetrahydrofurfuryl alcohol during shipment or storage.

A further object is to provide a color-stabilized tetrahydrofurfuryl alcohol composition.

An additional specific object of the invention is to provide a novel color stabilizer for tetrahydrofurfuryl alcohol.

The above objects are obtained in accordance with my invention by incorporating sodium ammonium phosphate into the tetrahydrofurfuryl alcohol.

I have discovered that when small amounts of sodium ammonium phosphate are added to tetrahydrofurfuryl alcohol, color formation is prevented. Tetrahydrofurfuryl alcohol which is stabilized with sodium ammonium phosphate in accordance with my invention may be stored over relatively long periods of time without deterioration.

Various amounts of sodium ammonium phosphate may be utilized. In general, the sodium ammonium phosphate is employed in amounts of at least 5 parts per million based on the weight of tetrahydrofurfuryl alcohol. A more preferable amount is about 100 parts per million or at least about 40 parts per million. However, amounts greater than 100 parts per million may be utilized although larger amounts usually have no advantage.

The following example is illustrative of my invention.

Example

A sample of tetrahydrofurfuryl alcohol was distilled and the purified product divided to provide several smaller samples of 200 grams each. These samples were immediately placed in plain glass bottles containing strips of iron. The iron was totally immersed and in each sample provided 15 square inches of iron. A cloth stopper was provided to prevent entrance of dust and a space was left in each bottle between the stopper and the upper level of the tetrahydrofurfuryl alcohol sample so that the tetrahydrofurfuryl alcohol was continuously in contact with air. The sodium ammonium phosphate in amounts of 5, 40, and 100 parts per million was added to different samples and the closed bottles containing the stabilized tetrahydrofurfuryl alcohol and iron were allowed to stand in an oven at 50° C. At the end of three days no color formation could be detected except for the sample containing 5 parts per million which had a very slight yellow discoloration. Another sample prepared as above and containing 100 parts per million of sodium ammonium phosphate was allowed to stand at room temperature in diffused light; at the end of three weeks no discoloration was apparent. Samples of the tetrahydrofurfuryl alcohol prepared as above but without any added stabilizer developed a dark-yellow discoloration within a few hours.

The present invention provides a simple and economical method for the color stabilization of tetrahydrofurfuryl alcohol so that the material may be stored for relatively long periods or shipped long distances without color formation in appreciable amounts. By the utilization of my invention it is unnecessary to redistill or otherwise purify tetrahydrofurfuryl alcohol prior to use.

I claim:

1. A method of stabilizing tetrahydrofurfuryl alcohol which comprises incorporating therein at least 5 parts per million of sodium ammonium phosphate by weight.

2. A method of stabilizing tetrahydrofurfuryl alcohol which comprises incorporating therein at least about 40 parts per million of sodium ammonium phosphate by weight.

3. A method of stabilizing tetrahydrofurfuryl alcohol which comprises incorporating therein about 100 parts per million of sodium ammonium phosphate by weight.

4. A stable tetrahydrofurfuryl alcohol composition comprising said alcohol having incorporated therein at least 5 parts per million of sodium ammonium phosphate by weight.

5. A stable tetrahydrofurfuryl alcohol composition comprising said alcohol having incorporated therein at least about 40 parts per million of sodium ammonium phosphate by weight.

6. A stable tetrahydrofurfuryl alcohol composition comprising said alcohol having incorporated therein about 100 parts per million of sodium ammonium phosphate by weight.

No references cited.